June 18, 1940.                    U. L. SMITH                    2,205,228
                                   WATTMETER
                                Filed Oct. 27, 1938

WITNESSES:                                                INVENTOR
                                                         Uel L. Smith.
                                                         BY
                                                         ATTORNEY Patented June 18, 1940

2,205,228

UNITED STATES PATENT OFFICE 2,205,228

WATTMETER

Uel L. Smith, Morris Plains, N. J., assignor to Westinghouse Electric & Manufacturing Company, East Pittsburgh, Pa., a corporation of Pennsylvania Application October 27, 1938, Serial No. 237,244

4 Claims. (Cl. 171—95)

This invention relates to instruments for measuring a function of the voltage and current flowing in a circuit, and it has particular relation to watt-meters of the dynamometer type.

Dynamometer instruments are well known in the art for measuring current, voltage and power of an electrical circuit. When employed for measuring power supplied to a load, two connections are commonly available for the coils of the dynamometer instrument. In the first connection, the current coil, which is a fixed coil, is connected in the circuit being measured between the voltage coil and the load. In the second connection, the voltage coil is connected across the circuit between the current coil and the load. Both of these connections introduce an error in the instrument measurement. In the first connection, the voltage coil is subjected not only to the voltage across the load, but to the voltage represented by the voltage drop in the current coil. As for the second connection, the current coil carries not only the current passing through the load, but the current passing through the voltage coil which is connected between the current coil and the load. These errors may be disregarded for measurements usually encountered in practice, but when the power being measured is of a low order, as below 250 watts, the errors become important and cannot be disregarded. As representative of the figure ordinarily encountered in practice, the current coil supplies approximately 90% of the force developed in the instrument and consumes between 1 and 2 watts. The moving coil or voltage coil takes between .05 and .25 of a watt, while the resistance commonly employed in series with the moving coil requires between 2 and 4 watts.

Because of the errors present in the ordinary type of dynamometer wattmeter, some manufacturers have developed a special construction for instruments designed for low power, say below 3000 watts. This construction adopted merely adds a compensating coil to the stationary current coil, the compensating coil being electrically connected in series with the moving coil. In this case, the moving coil is connected between the current coil and the load. The compensating coil is so wound that it opposes that portion of the current passing through the current coil that also flows through the moving coil. Consequently, in theory, an instrument embodying this special construction accurately indicates the power taken by the load. In practice, however, this construction is objectionable for the reason that in low current work, the drop across the stationary current coil may be as high as 50% of the line voltage, which seriously limits the voltage available for the load. Moreover, an instrument embodying a compensating coil is extremely difficult to calibrate.

In accordance with my invention, the current and voltage coils of a dynamometer instrument are interchanged from the positions in which they heretofore have been placed; that is, the moving coil is connected in series with the load to carry the current passing through the load, and the stationary coil is connected across the circuit supplying the load for energization in accordance with the voltage across the load. With such a construction, the moving coil having an extremely low voltage drop thereacross permits a substantial portion of the line voltage to be applied to the load. At the same time, the loss in the movable coil is so small that the error introduced in the reading of the instrument is negligible. When the instrument is to be employed for alternating-current measurements, a precaution has to be taken to assure a proper phase relationship between the currents flowing between the two coils. Because of the requirements of the stationary coil, it ordinarily must be constructed with a high inductance that would normally tend to displace the two currents from their proper phase relationship. In order to compensate for this displacement, I provide in series with the stationary coil a capacitive reactance for restoring the currents to their proper phase relationship.

It is, therefore, an object of my invention to provide an accurate instrument for measuring low values of a function dependent upon the voltage and current flowing in a circuit.

It is a further object of my invention to provide a dynamometer wattmeter which has a proper phase relationship between the currents flowing in its coils.

It is another object of my invention to provide a dynamometer instrument having a movable current coil, a stationary voltage coil, and a capacitance for correcting the phase displacement of currents flowing in the coils.

Other objects of my invention will be apparent from the following description taken in conjunction with the accompanying drawing, in which.

Figure 1:
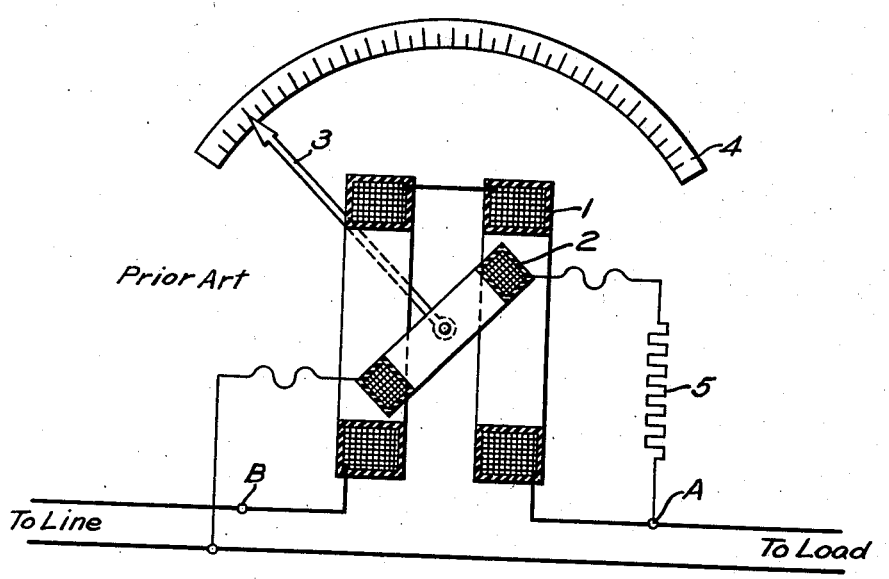
Figure 1 is a diagrammatic view of a dynamometer wattmeter known to the prior art.

Referring to the drawing, Fig. 1 shows a conventional dynamometer wattmeter comprising a fixed current coil 1 and a movable voltage coil 2 carrying a pointer 3 for cooperation with a scale 4. As ordinarily employed, the coil 2 is biased by a spring (not shown) to hold the pointer 3 normally at an extreme end of the scale. In the circuit of Fig. 1, the fixed coil 1 is connected in series with a load to carry the current passing therethrough, and the movable coil 2 is connected across a circuit supplying the load through a resistance 5 for limiting the current passing through the movable coil. With the connections as illustrated in Fig. 1, it will be noted that the current coil 1 must carry not only the current passing through the load, but also an additional current which passes through the movable coil 2 and resistor 5. As above explained, this additional current results in an error in the instrument reading.

If the resistor 5 of Fig. 1 instead of being connected to the circuit at a point A were connected at a point B, the current coil 1 then would carry only the current passing through the load, but the voltage across the movable coil 2 and its resistor 5 then would be not only the voltage across the load, but in addition thereto the voltage drop across the current coil 1, and this also would result in an erroneous reading.

Figure 2:
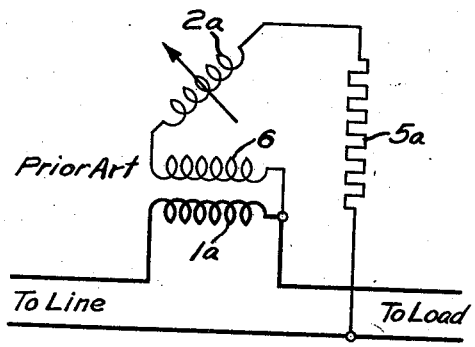
Fig. 2 is a diagrammatic view of a dynamometer wattmeter for low current measurements as heretofore employed.

Because of the errors present in the circuit arrangements of Fig. 1, dynamometer wattmeters have been developed along the line illustrated in Fig. 2. Here a fixed coil 1a, a movable coil 2a, and a resistor 5a are connected to a load in substantially the same manner as is illustrated in Fig. 1. However, in addition to the usual stationary winding 1a, an additional winding 6 is wound on the stationary winding and is connected in series with the movable coil 2a. The direction of winding is such that current passing through the winding 6 opposes current passing through the winding 1a and neutralizes the effect of that portion of the current passing through the fixed winding 1a, which passes through the moving coil 2a. Therefore, the only effective current in the fixed winding 1a is the load current, and since the load voltage is directly across the circuit including the moving coil 2a, it follows in theory that an instrument designed in accordance with Fig. 2 will properly indicate the power to be measured. However, as indicated above, such an instrument has serious disadvantages when used for low current measurements in that the voltage available for the load is unduly restricted and the movement may be calibrated only with difficulty.

Figure 3:
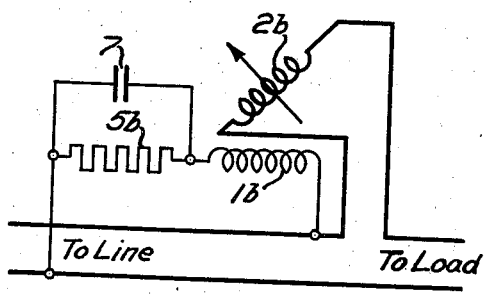
Fig. 3 is a diagrammatic view of a dynamometer wattmeter embodying my invention.

The above-noted disadvantages may be avoided by employing an instrument connected as shown in Fig. 3. According to these connections, a dynamometer wattmeter has a moving coil 2b connected in series with the load and, therefore, carries the current passing through the load. The instrument also has a fixed winding 1b connected across the circuit supplying the load and, therefore, carries a current responsive to the voltage of the circuit. With such an instrument, the voltage drop across the moving coil 2b as above-noted is so low that a satisfactory proportion of the available voltage is applied to the load. Also, the power consumption of the moving coil 2b is sufficiently low that the error caused thereby may be generally neglected in low current work. Unless the fixed coil 1b inherently has a sufficient resistance, an auxiliary resistance 5b is employed in series therewith to restrict the current flowing therethrough.

Although the instrument illustrated in Fig. 3, as thus far described, is suitable for direct-current work, when it is employed for alternating-current measurements, the current flowing through the coils 2b and 1b must be maintained in proper phase relationship. In order to establish a satisfactory field for the moving coil 2b, the fixed coil 1b generally must have a substantial inductance, and this tends to displace the current flowing therethrough from the current flowing through the moving coil 2b. Compensation for this phase displacement may be effected by providing in series with the fixed coil 1b a capacitive reactance 7, which is of a size sufficient to bring the currents into proper phase relationship for alternating current work. By placing this capacitance around the resistor 5b, the instrument may be employed for both alternating-current and direct-current measurements. It is to be understood, of course, that the total capacitive reactance present includes any capacitance inherently present in the resistor 5b.

Although I have described my invention with reference to certain specific embodiments thereof, it is obvious that many modifications are possible in the specific apparatus, circuits and construction illustrated and described. Therefore, I do not desire my invention to be restricted except as required by the appended claims when interpreted in view of the prior art.

I claim as my invention:

1. In a dynamometer wattmeter, a stationary voltage coil having substantial inductance, a current coil mounted for movement relative to said voltage coil in response to currents flowing through said coils, and means for correcting the phase angle between the currents flowing through said coils, said means comprising a capacitive reactance in series with said voltage coil.

2. In a dynamometer wattmeter, a stationary voltage coil having substantial inductance, a current coil mounted for movement relative to said voltage coil in response to currents flowing through said coils, a resistance in series with said voltage coil, and a capacitive reactance across said resistance.

3. In a dynamometer wattmeter system for accurately measuring low values of power supplied to a load in an alternating current electrical circuit, a stationary voltage coil connected for energization in accordance with the voltage of said electrical circuit, said voltage coil having a high inductance whereby current flowing therethrough lags the voltage across the voltage coil, a current coil mounted for movement relative to said voltage coil and connected between said voltage coil connections and the load to be measured for energization in accordance with current supplied to said load, and means for bringing currents flowing through said coils into proper phase relationship comprising a capacitive reactance connected in series with said voltage coil.

4. In a dynamometer wattmeter system for accurately measuring low values of power supplied to a load in an alternating current electrical circuit, a stationary voltage coil connected for energization in accordance with the voltage of said electrical circuit, said voltage coil having a high inductance whereby current flowing therethrough lags the voltage across the voltage coil, a current coil mounted for movement relative to said voltage coil and connected between said voltage coil connections and the load to be measured for energization in accordance with current supplied to said load, means for bringing currents flowing through said coils into proper phase relationship comprising a capacitive reactance connected in series with said voltage coil, and a resistance connected in parallel circuit relationship with said capacitive reactance, whereby said wattmeter system is effective for measuring both alternating and direct current quantities.

UEL L. SMITH.